May 17, 1938.  M. SCHWARTZ  2,117,509
FLASHLIGHT AND SHUTTER OPERATING DEVICE FOR CAMERAS
Filed June 16, 1934  2 Sheets-Sheet 1
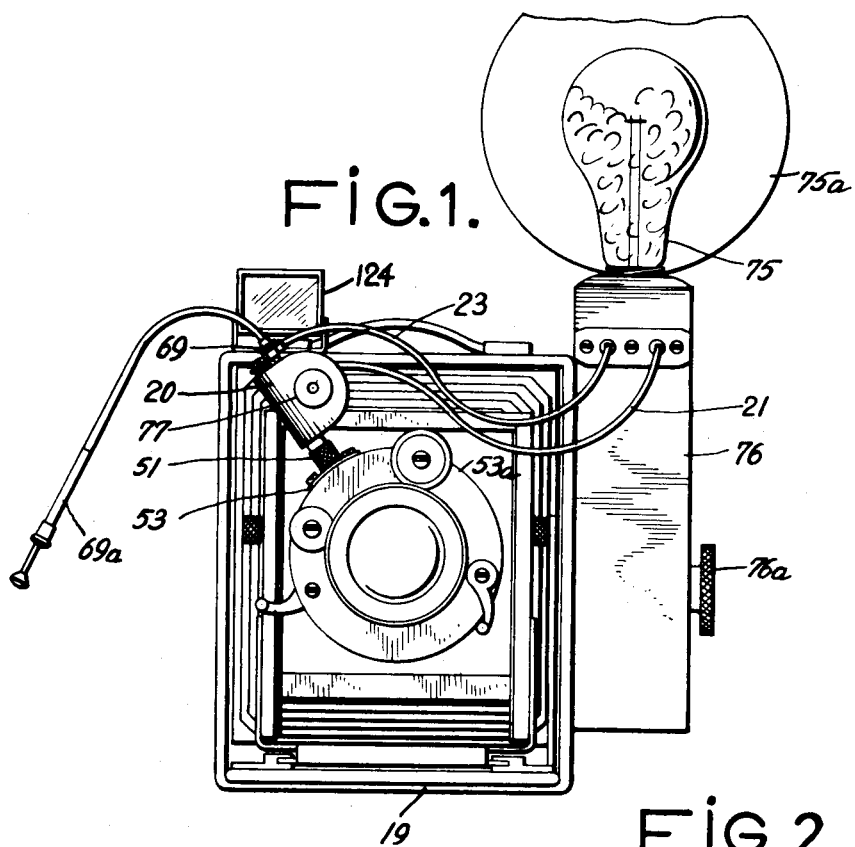
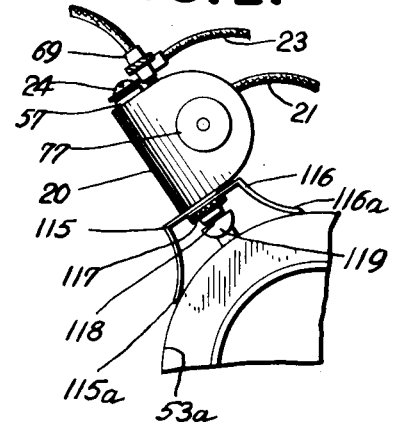
INVENTOR
*Morris Schwartz*
BY *Louis Casper*
ATTORNEY May 17, 1938.  M. SCHWARTZ  2,117,509
FLASHLIGHT AND SHUTTER OPERATING DEVICE FOR CAMERAS
Filed June 16, 1934  2 Sheets-Sheet 2
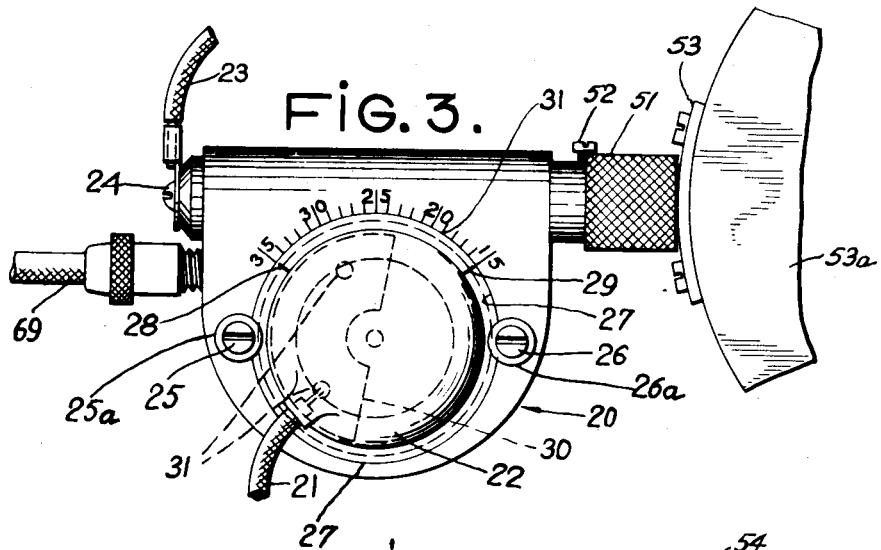
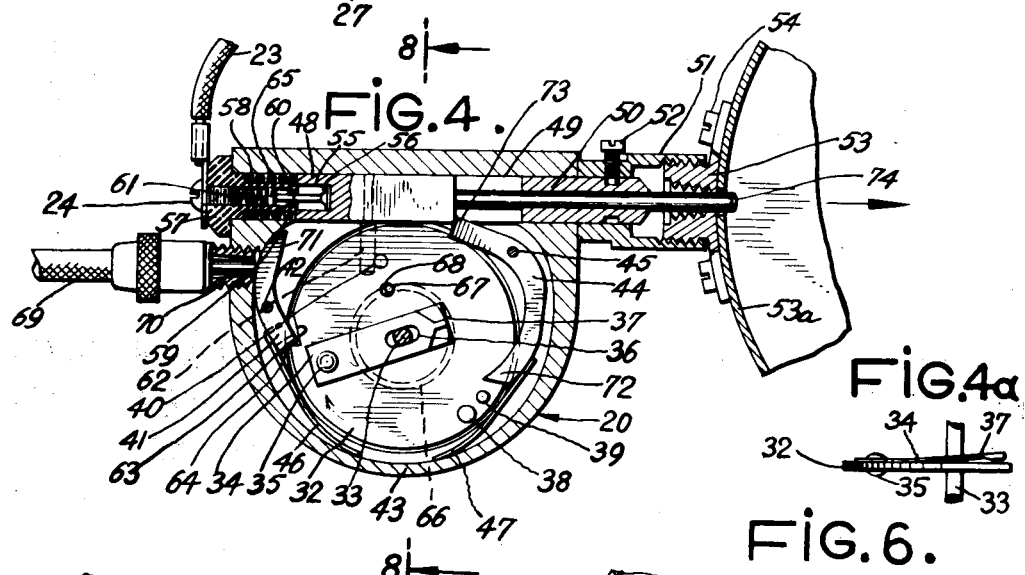
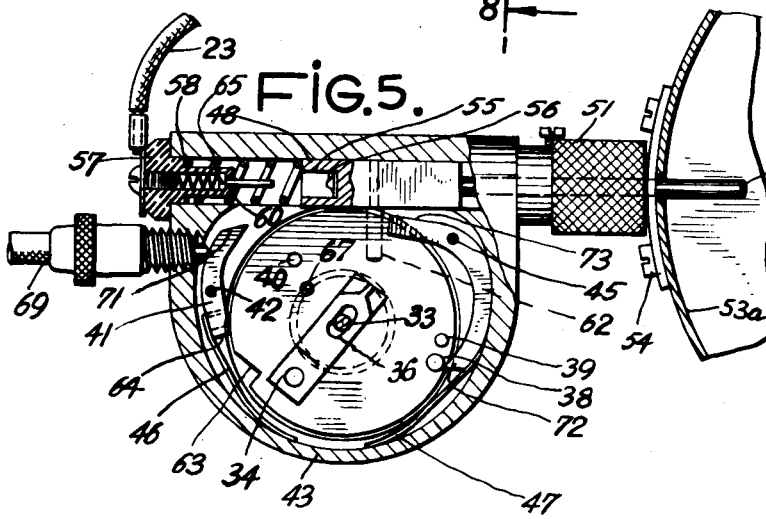
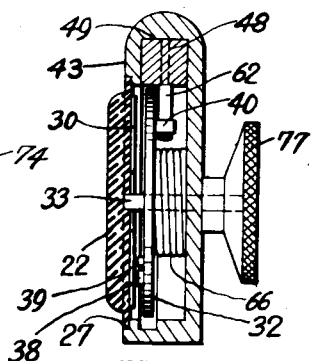
INVENTOR
*Morris Schwartz.*
BY *Louis Casper*
ATTORNEY Patented May 17, 1938

2,117,509

UNITED STATES PATENT OFFICE 2,117,509

FLASHLIGHT AND SHUTTER OPERATING DEVICE FOR CAMERAS

Morris Schwartz, Brooklyn, N. Y.

Application June 16, 1934, Serial No. 730,879

6 Claims. (Cl. 67—29)

My invention relates to a novel apparatus with which the operation of a camera shutter is synchronized with that of a flash light means.

My invention is particularly adapted to be used in connection with a lamp specially constructed for use in connection with making flash light pictures.

A further object of my invention is to provide an attachment to be mounted upon ordinary or standard types of cameras by which means both the camera shutter and the flash light aforesaid may be synchronously operated.

These ends were also the object of my earlier invention in this art, Patent No. 1,996,592, April 2, 1935.

The advantages of the present invention over my copending application is stated briefly as follows:

First, that only one operation sets the timing rotor and pulls up the plunger rod or bar. In my previous application two operations are required to produce the same result.

Second, in the present invention a safety factor is provided with respect to closing of the flash light circuit. This is attained by two distinct contact operations, the first being the contacting of the rotor contact with the plate contact on the insulated disc. A circuit closing contact is made during the period when the electrical plunger contacts are closed.

After completion of the rotor rotation, the plunger is released which breaks the circuit contact in the plunger arrangement.

During the period of rewinding the rotor preparatory for a new picture exposure, a contact is made and broken by the rotor contact and contact plate on the insulated disc. The plunger switch is closed during the last portion of the rewinding operation. There is required but one complete turn of the rotor thus making the rewinding operation simple and convenient.

There is also provided an improved adapter to secure the synchronizer unit to the camera shutter thereby avoiding damage to the camera shutter.

Guage markings are also provided designating settings preferably in milli-seconds indicating a time lag from .005 to .935 sec.

These setting or guage markings are preferably stamped on the metal case of the unit and indicate the setting time period between the closing of the flashlight circuit and the midpoint of the shutter opening.

There is also shown means for connecting lead wires between the synchronizer device and the flashlight unit that is attached to the camera.

In general, there are two types of photographic devices that are operated in connection with flash lights, the first of which is primarily a simple mechanism which automatically opens the camera shutter, flashes the lamp and then closes the shutter after said flash. The result aforementioned is usually accomplished by a single movement on the part of the operator by means of an automatic switch, the latter being sometimes termed a sequence switch.

The second type to which this invention particularly relates, is to effect a fast exposure by causing the camera shutter to open at some particular segment in the period of the flash cycle thereby performing a definite synchronizing function with respect to the flashlight as will be further explained.

With higher shutter speeds it is essential that the synchronizer device open the shutter so as to include all or a major portion of the peak of the flash. It requires approximately .005 sec. for the shutter to operate after the trigger has been pressed, and since a somewhat longer time than the time mentioned is required for the lamp to start its flash, some impeding factor must be introduced with reference to the action of the shutter.

With the adjustable timing feature that is included in the synchronizer unit comprising this invention, the mid-point of the shutter opening period may be adjusted to occur approximately .022 sec. after the time that the circuit is closed through the lamp. The aforementioned adjustment, however, may be varied to meet varying conditions incident to camera exposure work, and the fact that such adjustment is readily available to the user, will tend to result in a maximum percentage of successful pictures.

It is also important that there should be but a negligible variation in the combination shutter and synchronizer functions since a few thousandths of a second may mean the difference between the success and failure of a picture exposure. The reduction or practical elimination of variation referred to is made possible by the novel construction of the synchronizer unit herein described.

As a further description of my invention, attention is directed to the accompanying drawings forming a part of this specification and in which—

Fig. 1 shows a camera with the timing unit and flash light battery case unit attached to it.

The figure also shows a manner of attachment of said units. In this case the finder 124 is attached directly to the camera body.

Fig. 2 is a detail section showing a modified method of attaching the synchronizer unit to that shown in Fig. 1.

Fig. 3 shows an enlarged exterior view of the timing unit shown in Fig. 1. This figure also shows the dial setting for timing the operation of the timing unit.

Fig. 4 is a cross-sectional view of the timing unit shown in Fig. 3 with the mechanism set ready for photographic exposure.

Fig. 4a is a detail of the contact spring 35.

Fig. 5 is a crosssection view of Fig. 3 showing the position of the mechanism after photographic exposure.

Fig. 6 shows a sectional view of the synchronizer unit on a line 8—8 of Fig. 4.

Referring to Fig. 1, the synchronizer unit 20 is affixed to the shutter 53a of the camera 19. There is also secured to the camera 19 by means of the knurled screw 76a that is screwed into the tripod screw socket of said camera, the combination battery and flashlight holder unit 76. Wire conductors 21, 23 connect the electric contactors within the synchronizing unit 20 with the battery inside the battery holder 76.

Referring to Fig. 3, numeral 20 is the timing unit. 21 is the cable attached to a disc 22, the latter consisting of insulated material. Another single conductor cable 23 is attached by means of the screw 24 to the insulated bushing 57 which in turn is attached to the body 43 of the timing unit 20.

The insulated disc 22 rotatably slides in a circular groove 27 and is held in whatever position it is set by means of the screws 25 and 26 which are threaded into the body or casing of the timing unit 20. Suitable washers 25a and 26a are provided under the heads aforesaid to aid in substantially securing the disc 22 after it has been set.

The insulated disc 22 has inscribed upon it opposite guage markings 28 and 29. The disc is also provided on its reverse side with a metallic plate 30 secured to said disc by means of the screws 31.

The casing of the timing unit 20 is provided with scale division markings 31a indicating the setting for timing the period at which the electrical contact is to be made plus the time following the period of shutter exposure.

In the scale as shown, the timing may be adjusted for any setting desired within the limits of .007 to .035 sec. The electrical contacting is made automatically and in relation to the setting made on said scale; and said contacting is performed through the medium of the stored tension of the spring driving the rotor 32.

Referring to Fig. 4 which is a cross-sectional view of the unit 20 as shown in Fig. 3. In said Fig. 4 there is shown the metallic rotor 32 which turns in its axis on shaft 33. The rotor aforesaid is provided with a contact member 34 which is secured to the rotor aforesaid by means of the rivet 35. The said electrical contact member is provided with an elliptical slot through which the shaft 33 projects.

The contact member 34 is made of spring metal, and at the free end section thereof designated as 37 is bent upward from the surface of the rotor 32. The contact member as described is shown in detail in Fig. 4a.

The rotor 32 is also provided with two pins 38 and 39. The functions of the pins aforesaid will hereinafter be described.

The latch lever 41 is pivoted on the pivot pin 42 which is secured to the casing 43 of the unit 20. Another latch lever 44 is likewise pivoted by means of the pivot pin 45 which is secured to the casing 43. Both levers aforesaid are held in position shown in Fig. 4 by means of the tension of springs 46 and 47 respectively.

A square shaped plunger bar 48 is slidably placed in a correspondingly square shaped aperture 49 situated at the upper section of the casing 43 of the timing unit. The plunger bar 48 is provided with an extension rod 74 which protrudes beyond the casing 43 and projects through a bushing 50 which is fixed to the casing 43. The threaded sleeve 51 is held in position with respect to the bushing 50 by means of the set screw 52, so that by unscrewing the screw aforesaid, the sleeve 51 may be removed from the casing 43. The set screw 52 serves to hold the sleeve 51 in place after said sleeve has been adjusted with respect to the protrusion required of the extension rod 74. Said sleeve may be rotated by the fingers when said set screw is unscrewed. The knurling around the sleeve 51 assists the fingers in turning the aforesaid sleeve.

The sleeve 51 is screwed to a threaded bushing 53 which is attached to the camera shutter 53a by means of the screws 54.

At one end of the plunger bar 48 is an insulated grooved recess 55. Inside the groove aforesaid is a preferably non-corrosive metallic contact plate 56. The connecting screw 24 connects the cable 23 by means of an insulated bushing 57 to the casing 43. The bushing aforesaid has an aperture or recess 59 into which is placed a contact pin 65 that protrudes through an opening 60 of the bushing 57 and is held in contact with the contact plate 56 by means of a spiral spring 61.

The plunger bar 48 is provided with a stop pin 62. The function of the pin aforesaid is to lock the bar 48 into position in conjunction with the pin 40. The position of the plunger bar aforesaid is shown in Fig. 4.

The disc 32 is provided with a tooth-shaped cut-out section 63 into which there is movably fitted one end designated by the numeral 64 of the lever 41.

The plunger bar 48 is subject to the tension of the spring 58 when it is held in the position shown in Fig. 4. Said bar is thus held as shown by means of the contacting of the pins 40 and 62 and the locking of the pivoted lever 41 in the cut-out section 63.

The rotor 32 is under tension of the coiled spring 66, (Fig. 3) one end of which is designated by the numeral 67 and which protrudes out of and is held in position through a circular aperture 68 of the rotor 32.

The opposite end of the spring 66 is secured to the casing 43.

The method of operation of the apparatus so far described, is as follows:

After the desired timing is fixed by means of the adjustment settings on the disc 22, the flexible cable release 69 is pressed by the operator. When this occurs, the opposite end 70 of the push rod 69 presses against the extension arm 71 of the latch lever 41, and, under the tension aforesaid, the opposite end designated as 64 of the pivoted lever 41 slips out of the cut-out section 63 of the rotor 32.

The rotor aforesaid under the pressure influence of the spring 66 rotates in a clockwise direction which causes the electrical contact member 34 to contact with the electrical contact plate 30. The time duration of the electrical contact aforesaid depends, first, upon the setting of the timing adjustment, and second to the speed of the rotor which when released is controlled by the tension of the spring 66 and said rotor when once started, gathers momentum up to the time of its stoppage in the manner described.

The rotation of the rotor 32 throws the pin 40 out of contact with the pin 62. The plunger bar 48 is held under tension of the spring 58 when it is held in position by means of the stop-release member 44 as shown in Fig. 4.

When the pin 38 which is integrally secured to the disc 32 strikes the end designated as 72 of the stop-release member 44, it forces the opposite end designated as 73 of said stop-release member out of connection with the plunger bar 48.

The plunger bar aforesaid being as stated, under pressure influence of the spring 58 when released as described is made free to move in the direction of the arrow shown in Fig. 4. The plunger bar then assumes the position shown in Fig. 5. The movement aforesaid causes the terminal head of the sliding rod 74 to contact with the lens shutter of the camera and acts to release the same. It is important to note that the foregoing movement of the shutter only occurs after a complete rotation of the disc 32. The time delay for the flash lamp is produced by the time required for the rotor 32 to complete its rotation and the plunger and camera shutter to operate.

Adjustment of the delay timing over a fairly wide latitude is accomplished by rotating the insulated disc 22 seen in Fig. 3. The disc aforesaid carries the stationary contact. Thus the time interval from the closing of the circuit to the opening of the shutter can be varied.

The two wires, 21 and 23 leading to the lamp and battery can be seen extending to the left of the unit.

When the rotor and with it the contact spring member 34 has rotated and thereby contacted with the contact plate 30, an electrical circuit is completed or closed thereby causing the flash lamp to operate, the said circuit comprising the contact member, 34, contact plate 30, wire 21, battery 76, flash light 75, wire 23, connecting screw 24, tension spring 61, pin 59, contact plate 56, plunger bar 48 and the metal casing 43.

The bushing 57 insulates the conductor 23 from the casing 20 to provide a clear insulated electric circuit through the said wire conductor 23 to connecting screw 24 which is in metallic contact with spring 58, pin 59, plate 56 and bar 48, all of which are insulated by means of the bushing aforesaid from the casing 20.

When the synchronizer unit is fixed in the cocked position shown in Fig. 4, the contact pin 59 is forced into contact with the contact plate 56. The contacting aforesaid completes the circuit in so far as the aforesaid contacting is concerned. When the cable release 69ª is pressed, the rotor 32 is caused to rotate with the result as already described. Immediately on the completion of the rotation of said rotor and in sequence thereto, the contact pin 59 is forced away from the contact plate 56 incident to the forward movement of the plunger bar 48. The foregoing movement effectually causes a break in the electric circuit that includes the flashlight 75 and eliminates thereby any chance short-circuit immediately following the set off of the flash light aforesaid.

In the sequence of operations of the synchronizer unit as described, the electrical circuit aforesaid is broken before the camera shutter operates.

There is also no make or break in the foregoing electrical circuit which might affect the camera shutter electrically during the period of the operation of the latter.

To restore the timing unit to its original position as shown in Fig. 4, the position required preliminary to taking a new picture, the knurled hand screw 77 is turned in an anti-clockwise direction. This movement turns the shaft and with it the rotor 32, the latter being integrally attached to the shaft aforesaid. This action also winds up the spring 66, (see Fig. 6).

The pin 40 attached to the rotor 32 moves with the rotation of said rotor and comes into contact with the pin 62 thereby restoring the plunger bar 48 to the normal position shown in Fig. 4.

The flash lamp 75 is provided with a reflector 75ª as shown in Fig. 1.

In Fig. 2 there is shown a modified method of mounting the unit 20 on the camera shutter 53ª. The unit is secured to two flat spring braces 115, 116 bent in the manner shown in the figure forming two leg supports 115ª, 116ª. A circular opening through the metal spring braces aforesaid permits the neck of the unit 118 to project through the braces and to be secured to the camera shutter 53ª by means of cup screw collar 119. A knurled and threaded washer 117 is screwed on the neck 118 of the unit 20 and is tightly screwed upward underneath the formed metal strip 115.

This method of attaching the unit as described is desirable when applying the unit temporarily to various cameras.

It will thus be seen that a practical unit has been devised and one that is well adapted for high speed picture exposures, having particular novelty in timing and securing synchronous sequence of operation.

Now having described my invention, what I claim is—

1. In a synchronizer unit attachable to a camera; a timing rotor, a plunger rod controlled thereby; an insulated disc having a contact member thereon; a cooperating contact on said rotor, said contacts included in a circuit which also includes a flash light and battery; and means for setting said timing rotor and said plunger rod simultaneously in one operation preparatory to a succeeding operation of the unit aforesaid.

2. The structure according to claim 1 and means to cause said contact circuit to be broken immediately upon the release of the plunger aforesaid.

3. In a flashlight and shutter operating device attachable to a camera, a spring operated shutter actuator, a trigger release therefor, a spring driven rotatable disc to release said trigger, a flash light circuit contact carried by said disc, a companion contact plate secured to a rotatably adjustable insulated disc, said companion contact plate situated in the path of the movement of said insulated disc contact, the movement of said insulated disc causing a variable space relation between said contacts, said space relation indicated by scale division markings visible on the outside surface of the device aforesaid.

4. In a camera, a synchronizer unit attachable thereto, a spring impelled rotor in said unit; a contact mounted on said rotor; an insulated disc adjustably mounted on said unit, a cooperating contact on said disc; camera shutter tripping means which operates a shutter on said camera, said tripping means operated by said rotor; a cable release operating said rotor; a wire connection on said unit in electric connection with said contact; a wire connection secured to said disc and which is electrically connected to said cooperating contact, said wire connections included in a circuit which includes a battery and a flash bulb, said battery and flash bulb secured in a casing which is adjustably connected to the camera aforesaid.

5. In a flashlight and shutter operating unit for camera having a spring impelled rotor therein, a spring urged operating plunger, a turning handle for retracting under tension said plunger into cocked position and winding said rotor in one winding of said handle, means for holding said plunger bar in said cocked position preparatory for set off; means for holding said rotor in position under tension after said winding is made; an electrical contact on said rotor cooperating with an electrical contact member mounted on an insulated plate, a cable release attached to said unit that controls the release of said rotor, said rotor release causing the release of said plunger bar following the contacting of said contacts with the consequent flashing of a flash light bulb that is connected in a circuit including a battery and the contacts aforesaid.

6. The structure as set forth in claim 5 and said plunger bar in electrical contact with the metal casing of said unit when said plunger bar is in a cocked position, said plunger bar being electrically disconnected from said metal casing when said plunger bar is set off; said plunger bar contact and said metal casing, being also included in series in said flash light circuit, the said contacting and disconnection of said plunger bar with said metal casing providing a safety factor with respect to the operation of the flash light circuit as set forth.

MORRIS SCHWARTZ.